(12) United States Patent
Shiokawa et al.

(10) Patent No.: US 11,485,442 B2
(45) Date of Patent: Nov. 1, 2022

(54) STRADDLE-TYPE VEHICLE

(71) Applicant: HONDA MOTOR CO., LTD., Tokyo (JP)

(72) Inventors: Tatsuya Shiokawa, Wako (JP); Yasuo Narazaki, Wako (JP); Hikaru Yokomura, Wako (JP); Tsunehiro Kawabata, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 333 days.

(21) Appl. No.: 16/650,411

(22) PCT Filed: Sep. 28, 2018

(86) PCT No.: PCT/JP2018/036257
§ 371 (c)(1),
(2) Date: Mar. 25, 2020

(87) PCT Pub. No.: WO2019/065966
PCT Pub. Date: Apr. 4, 2019

(65) Prior Publication Data
US 2021/0206447 A1 Jul. 8, 2021

(30) Foreign Application Priority Data
Sep. 28, 2017 (JP) .............................. JP2017-188906

(51) Int. Cl.
*B62J 45/415* (2020.01)
*B62J 9/22* (2020.01)
(Continued)

(52) U.S. Cl.
CPC ............. *B62J 45/4151* (2020.02); *B62J 9/22* (2020.02); *B62J 11/19* (2020.02); *B62J 43/20* (2020.02);
(Continued)

(58) Field of Classification Search
CPC ........ B62J 45/4151; B62J 45/20; B62J 43/20; B62J 9/22; B62K 11/04; B62K 19/00; B62K 19/30
See application file for complete search history.

(56) References Cited

U.S. PATENT DOCUMENTS 8,794,366 B2 * 8/2014 Taguchi ................ H01M 50/20
180/68.5
9,776,493 B2 * 10/2017 Ono ....................... H01M 50/20
(Continued)

FOREIGN PATENT DOCUMENTS

EP 1531104 5/2005
JP 61-091484 6/1986
(Continued)

OTHER PUBLICATIONS

International Search Report and Written Opinion for International Application No. PCT/JP2018/036257 dated Dec. 11, 2018, 10 pages.

*Primary Examiner* — Tony H Winner
*Assistant Examiner* — Michael R Stabley
(74) *Attorney, Agent, or Firm* — Amin, Turocy & Watson, LLP

(57) ABSTRACT

The present invention relates to a straddle-type vehicle provided with: a front wheel; a rear wheel; an electrical component box that houses a battery; electrical components such as a relay connected to the battery; and electrical component attachment parts with which the electrical components are attached to the electrical component box, wherein the electrical component box is made of a resin, and at least a bank angle sensor is housed in the electrical component box.

8 Claims, 5 Drawing Sheets

(51) Int. Cl.
  *B62K 19/30* (2006.01)
  *B62K 11/04* (2006.01)
  *B62J 45/20* (2020.01)
  *B62J 43/20* (2020.01)
  *B62J 43/30* (2020.01)
  *B62J 11/19* (2020.01)
  *B62K 19/00* (2006.01)
  *B62K 11/10* (2006.01)

(52) U.S. Cl.
  CPC ............... *B62J 43/30* (2020.02); *B62J 45/20* (2020.02); *B62K 11/04* (2013.01); *B62K 19/00* (2013.01); *B62K 11/10* (2013.01); *B62K 19/30* (2013.01)

(56) References Cited

U.S. PATENT DOCUMENTS

| | | | |
|---|---|---|---|
| 10,046,821 B2* | 8/2018 | Koishikawa | B62K 25/283 |
| 2014/0014427 A1 | 1/2014 | Taguchi | |
| 2014/0015455 A1 | 1/2014 | Yonehana | |
| 2017/0101148 A1* | 4/2017 | Koishikawa | B62K 25/04 |

FOREIGN PATENT DOCUMENTS

| | | |
|---|---|---|
| JP | 2005-145287 | 6/2005 |
| JP | 2011-020501 | 2/2011 |
| JP | 2014-015138 | 1/2014 |
| WO | 2012/132582 | 10/2012 |
| WO | 2017/154117 | 9/2017 |

\* cited by examiner

STRADDLE-TYPE VEHICLE

TECHNICAL FIELD

The present invention relates to a battery-equipped straddle-type (saddle-type) vehicle.

BACKGROUND ART

A saddle-type vehicle described in Japanese Laid-Open Patent Publication No. 2014-015138 addresses challenges to simplify mounting of electrical components while making it possible to place, near a battery, an electrical component box with mounting portions on which the electrical components, which are connected to the battery, are mounted.

To solve the above challenges, the saddle-type vehicle of Japanese Laid-Open Patent Publication No. 2014-015138 includes an electrical component box that houses a battery and electrical components, such as a relay, which are connected to the battery. Moreover, this saddle-type vehicle includes mounting portions on which the electrical components, which are connected to the battery, are mounted.

SUMMARY OF INVENTION

The above-described existing saddle-type vehicle of Japanese Laid-Open Patent Publication No. 2014-015138 or the like is undesirably affected greatly by mud and so forth when traveling off road. The placement of electrical components that can simplify harnesses while protecting the electrical components from mud and so forth is needed.

The present invention has been made to solve the above-described problem and an object thereof is to provide a saddle-type vehicle that can curb the influence of mud and so forth on electrical components even when traveling off road, for example, by putting the electrical components together.

A saddle-type vehicle according to the present invention is a saddle-type vehicle including: a front wheel; a rear wheel; and an electrical component box that houses a battery and includes mounting portions on which electrical components, which are connected to the battery, are mounted, and has the following features.

A first feature; in the saddle vehicle, the electrical component box is made of resin and at least a bank angle sensor is housed in the electrical component box.

A second feature; in the saddle vehicle, the electrical component box is fixed to a side of a triangular portion of a frame made up of a main frame, a seat frame, and a rear frame.

A third feature; in the saddle vehicle, the battery is placed in an area, of the inside of the electrical component box, near a lower apex corresponding to the triangular portion, and a start magnet switch is obliquely placed in an area, of the inside of the electrical component box, near a side portion extending to one upper apex from the lower apex corresponding to the triangular portion. Moreover, in the saddle vehicle, the bank angle sensor is placed in a location, of the inside of the electrical component box, which is close to a location in which the battery is placed and a location in which the start magnet switch is placed and above the location in which the start magnet switch is placed.

A fourth feature; in the saddle vehicle, an electronic control unit is housed in the electrical component box. In the electrical component box, a protrusion for guiding a wire harness is provided between the electronic control unit and the bank angle sensor.

A fifth feature; in the saddle vehicle, in the electrical component box, a main fuse, a sub-fuse, a diode, and a regulator are additionally placed.

A sixth feature; in the saddle vehicle, in an area, of the inside of the electrical component box, from the lower apex corresponding to the triangular portion to the one upper apex, the battery, the start magnet switch, the main fuse, and the sub-fuse are placed in this order.

A seventh feature; an upper part of the electrical component box is placed below the seat frame on the outward side in a vehicle-width direction, and, in an upper end face of the electrical component box, ribs for guiding wire harnesses are provided in locations that overlap the seat frame when viewed from a side.

An eighth feature; the ribs include at least one first rib and at least one second rib which are placed in an alternating manner, the first rib is provided on the outward side in the vehicle-width direction and has an arc-like shape facing the inward side in the vehicle-width direction, and the second rib is provided on the inward side in the vehicle-width direction and has an arc-like shape facing the outward side in the vehicle-width direction.

A ninth feature; the electrical component box includes a coupler holding portion that holds a coupler for coupling a plurality of wire harnesses together, and the coupler holding portion is placed inside the main frame.

A tenth feature; the coupler holding portion includes a harness holding portion for holding wire harnesses.

According to the first feature, by housing at least the bank angle sensor in the electrical component box, it is possible to put the electrical components such as a relay together and curb the influence of mud and so forth on the electrical components even when traveling off road, for example. Moreover, the electrical component box is made of resin. Here, the resin includes synthetic resin, rubber, and so forth. By using the electrical component box made of resin, it is possible to prevent engine vibrations and traveling vibrations from being transmitted to the bank angle sensor.

According to the second feature, when viewed from above, a muffler is placed on the right side with respect to the center of a vehicle body and the electrical component box is placed on the left side with respect to the center of the vehicle body, which provides good weight balance. In addition, it is possible to put the electrical components such as a relay together on one side (for example, the left side) with respect to the center of the vehicle body.

According to the third feature, by placing the battery in an area, of the inside of the electrical component box, near the lower apex corresponding to the triangular portion and placing the start magnet switch in an area, of the inside of the electrical component box, near the side portion extending to the one upper apex from the lower apex, it is possible to shorten the distance from the battery to the start magnet switch. Moreover, by obliquely placing the start magnet switch, it is possible to place the bank angle sensor between the battery and the start magnet switch, which makes it possible to put the electrical components together more effectively.

According to the fourth feature, even when the length of a wire harness to the electronic control unit varies, the protrusion prevents the wire harness from touching the bank angle sensor, which makes it possible to prevent vibrations of the wire harness from directly entering the bank angle sensor. This contributes to prevention of disturbance to the bank angle sensor. Moreover, by providing, between the electronic control unit and the bank angle sensor, the protrusion for guiding a wire harness, it is possible to dispose a wire harness leading to the electronic control unit and other wire harnesses separately by using the protrusion, which makes it possible to achieve an increase in efficiency of wiring work. Furthermore, it is possible to prevent the rubber mount effect of the bank angle sensor from being lost by being pressed by the wire harness.

According to the fifth feature, it is possible to further increase the number of electrical components which are put together in the electrical component box, which makes it possible to curb the influence of mud and so forth on the electrical components more effectively even when traveling off road, for example.

According to the sixth feature, it is possible to shorten the distance between the main fuse and the sub-fuse and perform wiring work and maintenance work smoothly. Moreover, it is possible to drain water from the one upper apex corresponding to the triangular portion toward the lower apex.

According to the seventh feature, since the upper part of the electrical component box is placed below the seat frame on the outside in the vehicle-width direction, the upper end face of the electrical component box is exposed so as to be seen from above. In addition, since the ribs for guiding the wire harnesses are provided in the upper end face of the electrical component box, it is possible to dispose the wire harnesses using the upper end face of the electrical component box, which makes it possible to improve the efficiency of wiring work.

According to the eighth feature, since the wire harnesses can be retained alternately by the first rib and the second rib on the right and left sides, it is possible to mount the wire harnesses easily and securely.

According to the ninth feature, the coupler holding portion can make at least the coupler waterproof. In addition, since the coupler holding portion is placed inside the main frame, it is possible to make the coupler waterproof more appropriately and prevent easy access to the coupler by an occupant or the like.

According to the tenth feature, it is possible to prevent a wire harness leading to the battery and a wire harness coming from the battery from hanging down loosely, which makes it possible to prevent, for example, unusual noises from being caused as a result of the wire harness swinging or touching another apparatus.

DESCRIPTION OF EMBODIMENTS

Hereinafter, an embodiment example of a saddle-type vehicle according to the present invention will be described with reference to FIGS. 1 to 5. Unless otherwise specified, directions such as front and rear, right and left, and above and below in the description are assumed to be identical to directions with respect to a vehicle body.

Figure 1:
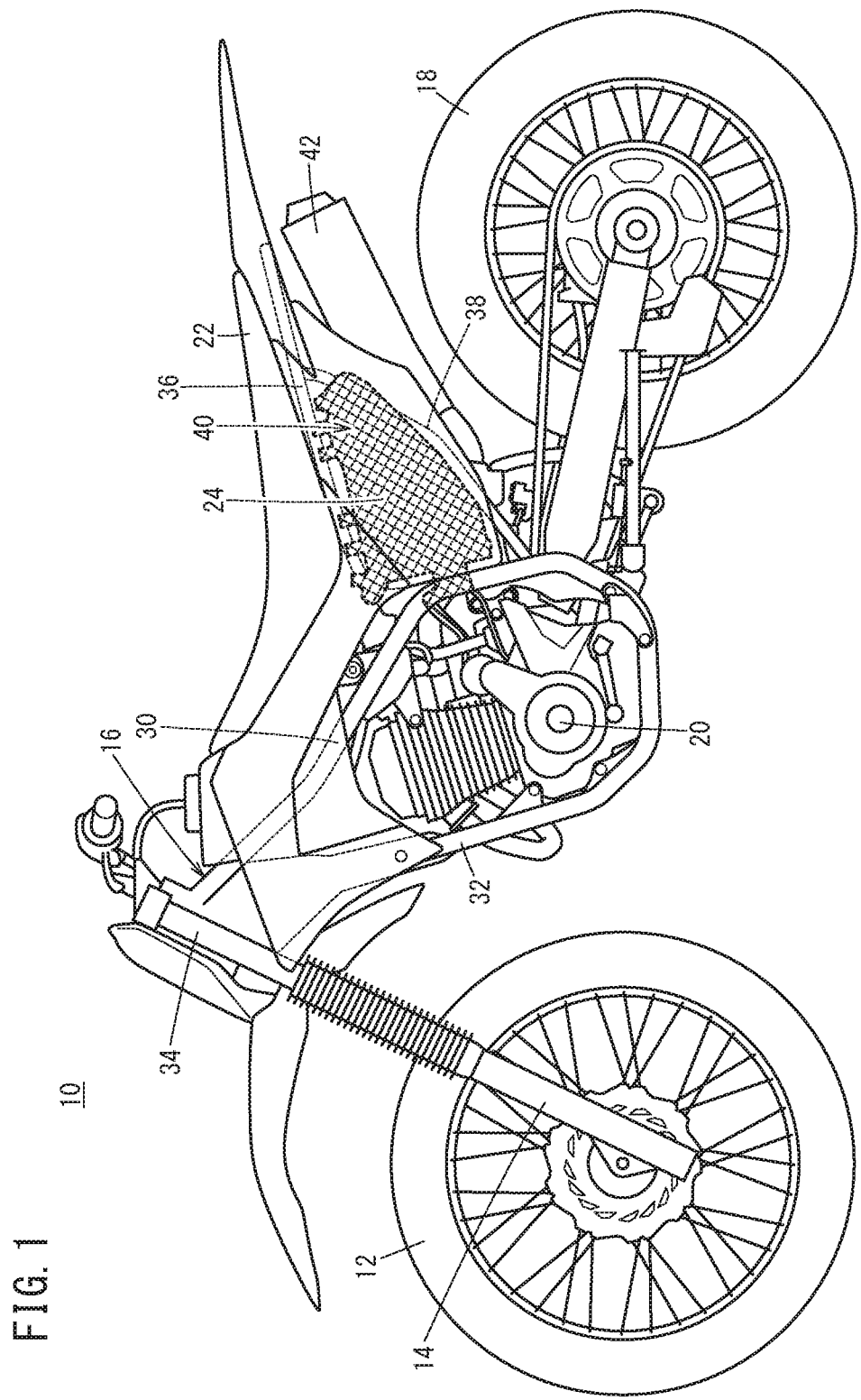
FIG. 1 is a side view showing an example of a saddle-type vehicle according to the present embodiment.

As shown in FIG. 1, a saddle-type vehicle (hereinafter referred to as a vehicle 10) according to the present embodiment includes a front wheel 12, a front fork 14 that supports the front wheel 12, a vehicle body frame 16 that supports the front fork 14 in a steerable manner, and a rear wheel 18 that is a driving wheel of the vehicle 10. Moreover, the vehicle 10 includes a power unit 20, a seat 22 on which an occupant sits, and an electrical component box 24 made of resin, which is formed under the seat 22. Here, the resin includes synthetic resin, rubber, and so forth.

With consideration given to deflection in the entire vehicle body frame 16, in order to increase stiffness, a frame structure of the vehicle 10 is made up of at least a pair of right and left main frames 30 that extend rearward and a pair of right and left down frames 32 that extend downward.

That is, the structure of the vehicle body frame 16 includes the following frames.

(a) A head pipe 34 that supports the front fork 14 in a steerable manner (see FIG. 1).

(b) The pair of right and left main frames 30 branching off from an upper rear part of the head pipe 34 and extending downward and rearward when viewed from a side.

(c) The pair of right and left down frames 32 branching off leftward and rightward from a lower rear part of the head pipe 34 and extending downward and rearward more steeply than the main frames 30 when viewed from a side and then connected to the pair of right and left main frames 30.

(d) A pair of right and left seat frames 36 extending to a rear part of the vehicle 10 from some midpoints of the right and left main frames 30 along the seat 22.

(e) A pair of right and left rear frames 38 extending to rear parts of the pair of right and left seat frames 36 from lower parts of the right and left main frames 30.

As shown in FIG. 1, in the vehicle 10 according to the present embodiment, the electrical component box 24 is installed in an area obliquely in front of the rear wheel 18 and on a side of a triangular portion 40 of a frame made up of the main frame 30, the seat frame 36, and the rear frame 38. An upper part of the electrical component box 24 is located below the seat frame 36, and the electrical component box 24 itself is placed on the outward side of the vehicle body in a vehicle-width direction thereof.

Figure 5:
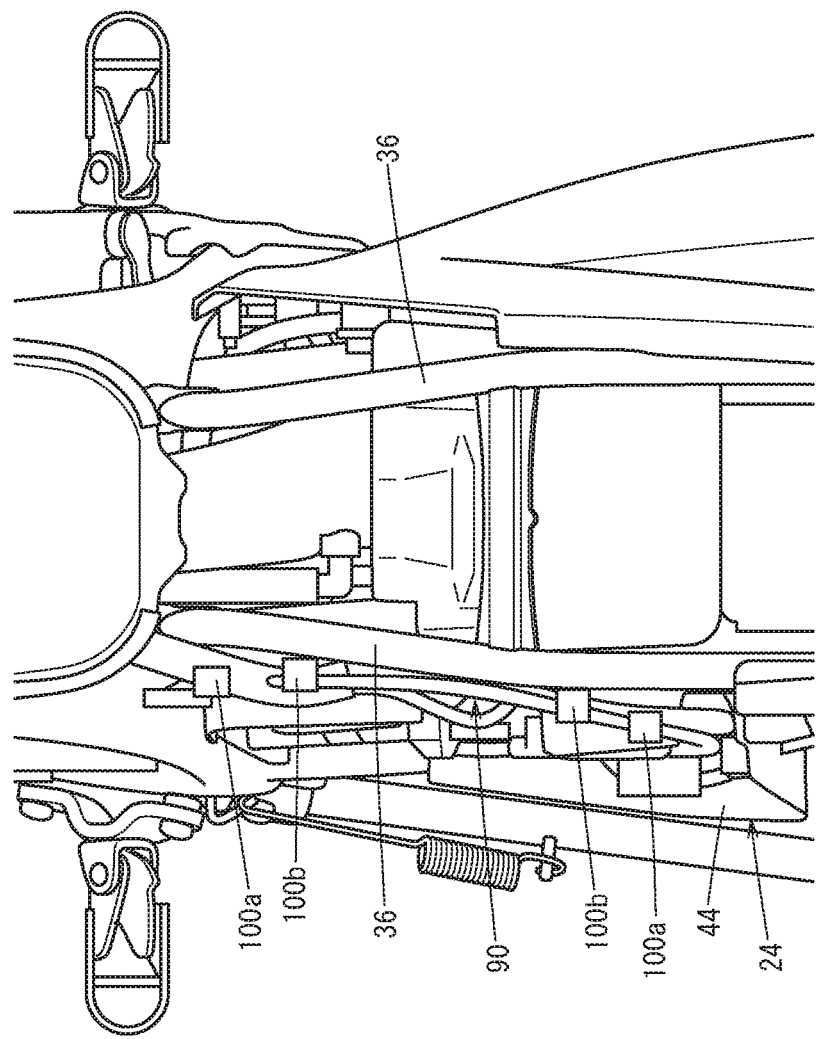
FIG. 5 is a plan view showing the inside of the electrical component box along with part of a vehicle, which are viewed from above.

That is, as shown in FIG. 5, when viewed from above, a muffler 42 (see FIG. 1) is placed on the right side, for example, with respect to the center of the vehicle body and the electrical component box 24 is placed on the left side, for example, with respect to the center of the vehicle body. It goes without saying that the muffler 42 may be placed on the left side and the electrical component box 24 may be placed on the right side. The electrical component box 24 includes a case 44 whose bottom is located on the side thereof where the vehicle body is located and an unillustrated lid that closes an opening of the case 44, and has an outside shape that is substantially the same as the shape of the above-described triangular portion 40.

Figure 2:
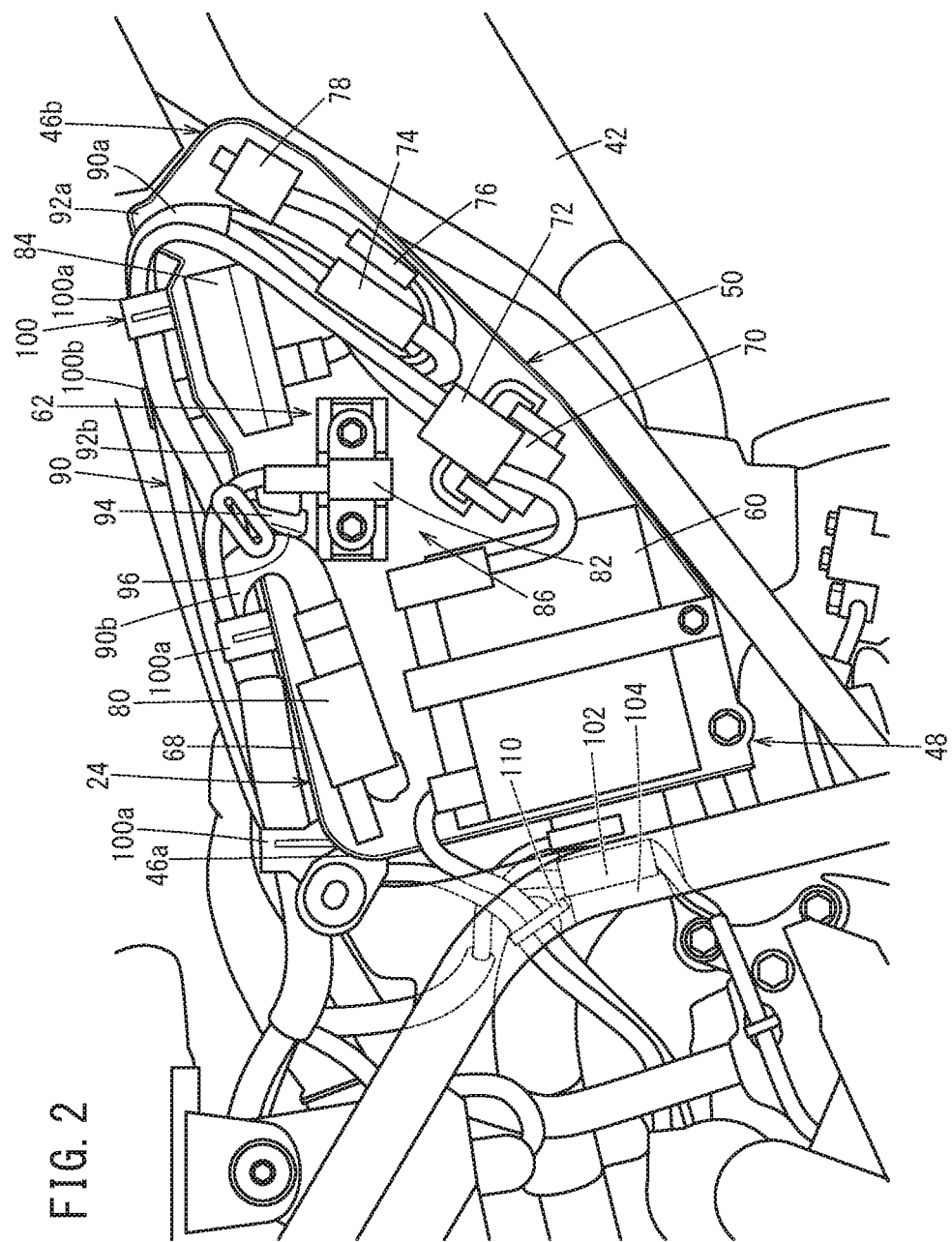
FIG. 2 is an enlarged side view of the inside of an electrical component box.

As shown in FIG. 2, the electrical component box 24 has a first upper apex 46a, which is located in the front of an upper part, a second upper apex 46b, which is located in the rear of the upper part, and a lower apex 48, which is located in a front lower part, so as to correspond to the triangular portion 40 (see FIG. 1). In particular, a side portion 50 extending obliquely upward from the lower apex 48 toward the second upper apex 46b is formed. In the electrical component box 24, at least a battery 60 and electrical components 62 including a relay and so forth which are connected to the battery 60 are housed.

Figure 3:
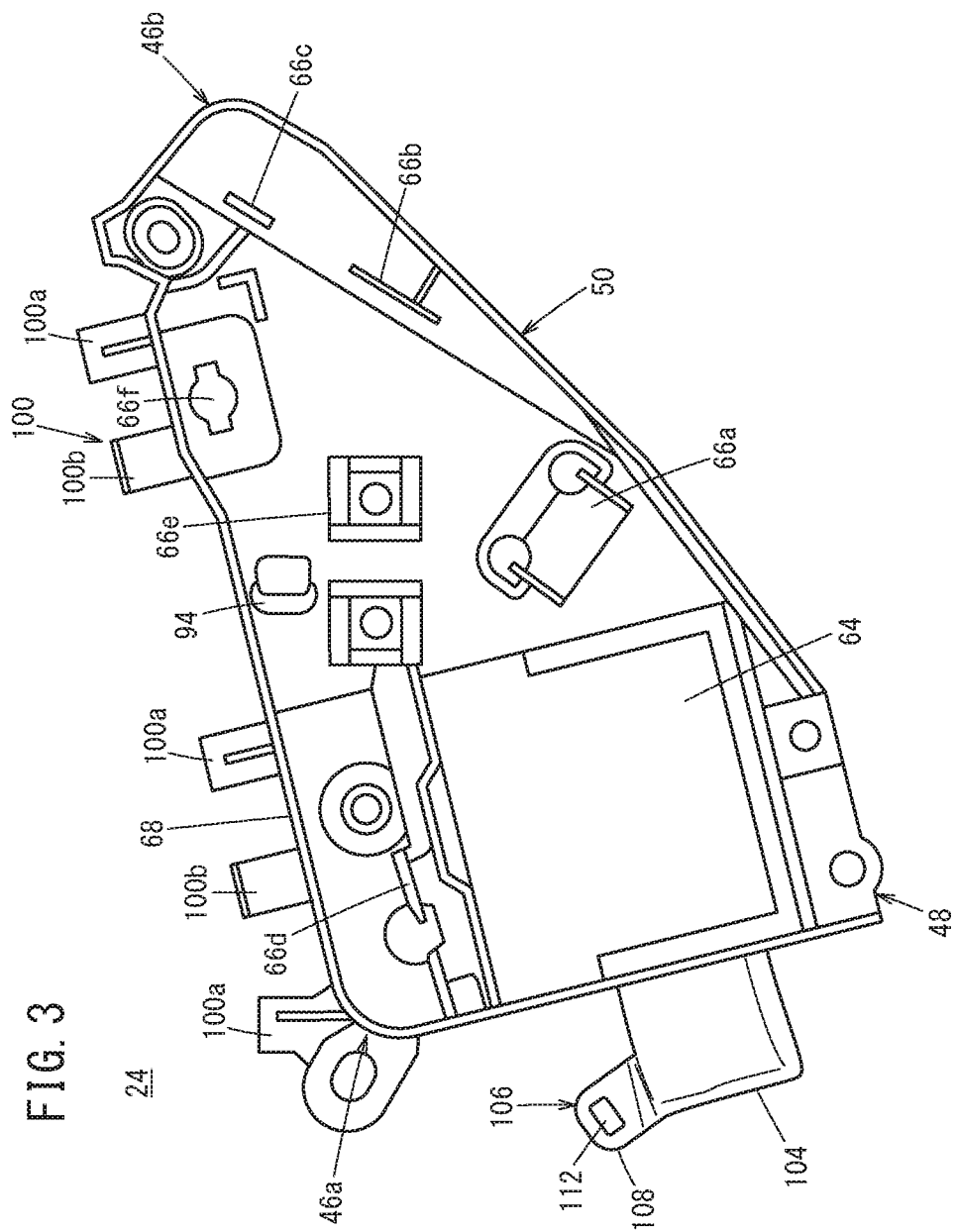
FIG. 3 is a side view of an example of a related part mounting portion provided in the electrical component box.

As shown in FIG. 3, on the bottom in the electrical component box 24, a battery mounting portion 64 on which the battery 60 is mounted and a plurality of electrical component mounting portions (first to sixth mounting portions 66a to 66f) on which the electrical components 62 are mounted are provided.

The battery mounting portion 64 is provided in an area, of the electrical component box 24, near the lower apex 48 (a location close to the lower apex 48). Moreover, the first mounting portion 66a, the second mounting portion 66b, and the third mounting portion 66c are provided along the side portion 50. Furthermore, the fourth mounting portion 66d, the fifth mounting portion 66e, and the sixth mounting portion 66f are provided along an upper end face 68 of the electrical component box 24. The fourth mounting portion 66d is provided above the battery mounting portion 64, the fifth mounting portion 66e is provided above the first mounting portion 66a, and the sixth mounting portion 66f is provided above the second mounting portion 66b.

As also shown in FIG. 2, a start magnet switch 70 and a main fuse 72 are mounted on the first mounting portion 66a, a pump relay 74 and a diode 76 are mounted on the second mounting portion 66b, and a sub-fuse 78 is mounted on the third mounting portion 66c.

The input-output directions of wire harnesses 90 of the start magnet switch 70, the main fuse 72, the pump relay 74, the diode 76, and the sub-fuse 78 mounted on these first to third mounting portions 66a to 66c are directions along the side portion 50. Thus, at least the start magnet switch 70, the main fuse 72, the pump relay 74, and the diode 76 are mounted in such a way that their longitudinal directions are oblique directions along the side portion 50.

Meanwhile, an electronic control unit (an ECU 80) is mounted on the fourth mounting portion 66d, a bank angle sensor 82 is mounted on the fifth mounting portion 66e, and a regulator 84 is mounted on the sixth mounting portion 66f. As described above, since the start magnet switch 70 which is mounted close to the battery 60 is obliquely mounted along the side portion 50, a space 86 is formed between the battery 60 and the start magnet switch 70 close to the battery 60. This makes it possible to provide the fifth mounting portion 66e in an area close to the space 86. That is, it is possible to place the bank angle sensor 82 in a location in the electrical component box 24, which is close to a location in which the battery 60 is placed and a location in which the start magnet switch 70 is placed and above the location in which the start magnet switch 70 is placed.

In the electrical component box 24, a first opening 92a and a second opening 92b through which the wire harnesses 90 are passed are provided. The first opening 92a is provided near the second upper apex 46b and the second opening 92b is provided in an area, of the upper end face 68, which is located above the fifth mounting portion 66e. A first wire harness 90a coming from the pump relay 74 and the like is passed through the first opening 92a and a second wire harness 90b coming from the ECU 80 is passed through the second opening 92b.

Moreover, between the fifth mounting portion 66e and the second opening 92b, a protrusion 94 for guiding the second wire harness 90b coming from the ECU 80 to the second opening 92b is provided. More specifically, the protrusion 94 is provided between the ECU 80 mounted on the fourth mounting portion 66d and the bank angle sensor 82 mounted on the fifth mounting portion 66e and between the bank angle sensor 82 and the second opening 92b. A taper 96 may be provided in a face, of the protrusion 94, which faces the ECU 80 so as to guide the second wire harness 90b coming from the ECU 80 to the second opening 92b with ease.

As shown in FIG. 2, in the upper end face 68 of the electrical component box 24, a plurality of ribs 100 for guiding the wire harnesses 90 are provided in locations that overlap the seat frame 36 when viewed from a side. That is, the plurality of ribs 100 projecting upward are provided in the upper end face 68 of the electrical component box 24, and these ribs 100 and the seat frame 36 overlap each other when viewed from a side.

Figure 4:
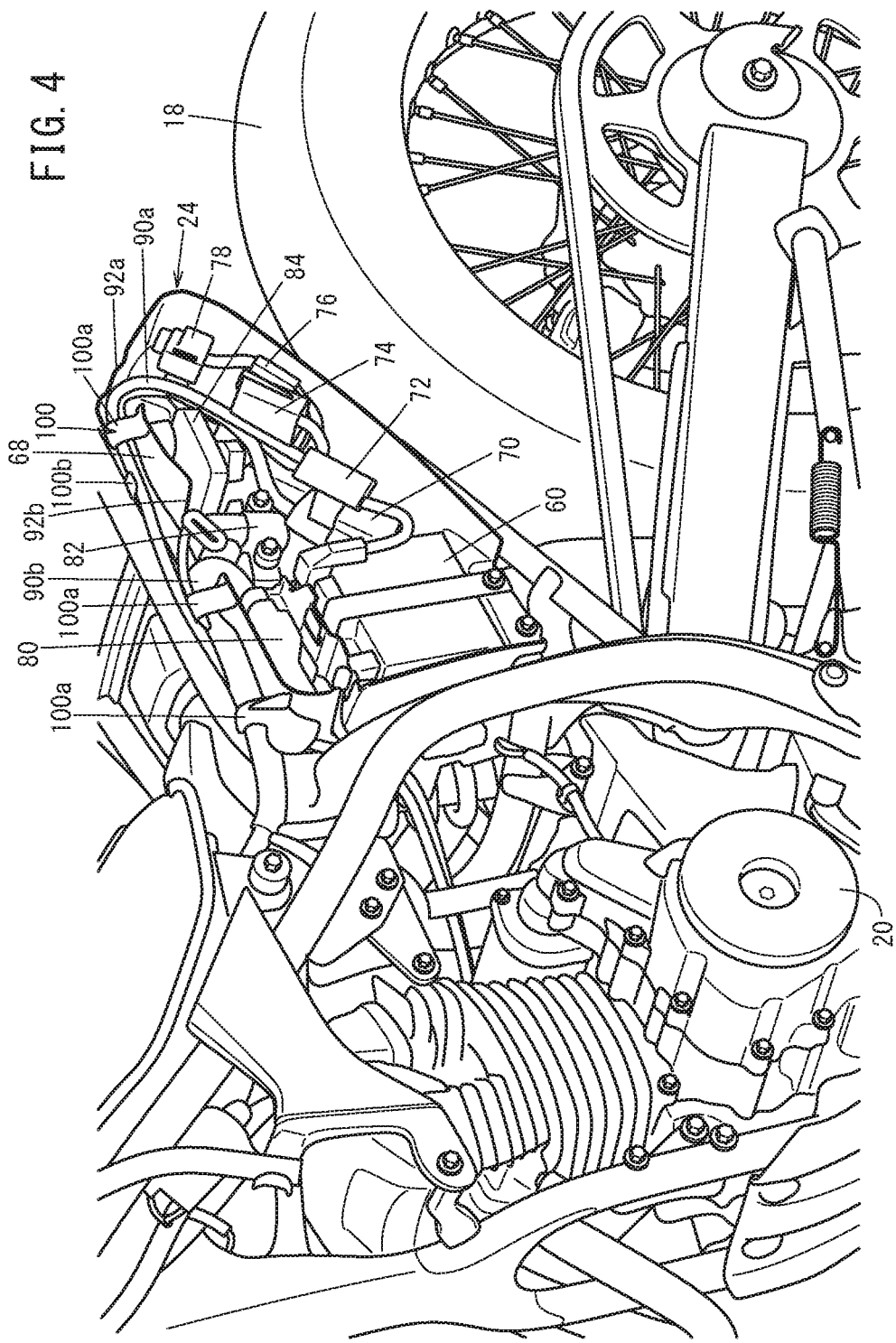
FIG. 4 is a perspective view showing the inside of the electrical component box which is viewed from a head pipe.

As also shown in FIGS. 4 and 5, the ribs 100 include at least one first rib 100a and at least one second rib 100b which are placed in an alternating manner. The first rib 100a is provided on the outward side in the vehicle-width direction, faces the inward side in the vehicle-width direction, and has an arc-like shape which is curved outward in the vehicle-width direction. The second rib 100b is provided on the inward side in the vehicle-width direction, faces the outward side in the vehicle-width direction, and has an arc-like shape which is curved inward in the vehicle-width direction. In an example of FIG. 4, an example in which three first ribs 100a and one second rib 100b are provided is shown and, in an example of FIG. 5, an example in which two first ribs 100a and two second ribs 100b are provided is shown; however, the example is not limited thereto. The number of first ribs 100a and the number of second ribs 100b can be appropriately chosen in accordance with the length of the upper end face 68 and the number, sizes, and so forth of the wire harnesses 90.

Furthermore, as shown in FIG. 2, the vehicle 10 includes a coupler 102 for coupling a plurality of wire harnesses 90 together. The electrical component box 24 includes a coupler holding portion 104 for holding the coupler 102. As shown in FIG. 3, the coupler holding portion 104 is formed so as to have the shape of a case with an opening in a top face thereof and is provided in a front face portion of the electrical component box 24. That is, the coupler holding portion 104 is placed inside the pair of right and left main frames 30.

Moreover, as shown in FIG. 3, the coupler holding portion 104 includes a harness holding portion 106 for holding the wire harnesses 90 coupled to the coupler 102. The harness holding portion 106 is made up of, for example, a plate piece 108 projecting forward from part of an upper edge of the coupler holding portion 104, and, in the plate piece 108, for example, an opening 112 through which a tie 110 (see FIG. 2) for tying the wire harnesses 90 together is inserted is formed.

As described above, the saddle-type vehicle 10 according to the present embodiment includes the front wheel 12, the rear wheel 18, the electrical component box 24 that houses the battery 60, and the electrical components, such as a relay, which are connected to the battery 60, and, in the saddle-type vehicle 10 including mounting portions by which the electrical components are mounted on the electrical component box 24, the electrical component box 24 is made of resin and at least the bank angle sensor 82 is housed in the electrical component box 24.

As a result, by housing at least the bank angle sensor 82 in the electrical component box 24, it is possible to put the electrical components such as a relay together and curb the influence of mud and so forth on the electrical components even when traveling off road, for example. Moreover, the electrical component box 24 is made of resin. Here, the resin includes synthetic resin, rubber, and so forth. By using the electrical component box 24 made of resin, it is possible to prevent transmission of engine vibrations and traveling vibrations.

In the present embodiment, the electrical component box 24 is fixed to a side of the triangular portion 40 of a frame made up of the main frame 30, the seat frame 36, and the rear frame 38.

As a result, when viewed from above, the muffler 42 is placed on the right side with respect to the center of a vehicle body and the electrical component box 24 is placed on the left side with respect to the center of the vehicle body, which provides good weight balance. In addition, it is possible to put the electrical components such as a relay together on one side (for example, the left side) with respect to the center of the vehicle body.

In the present embodiment, the battery 60 is placed in an area, of the inside of the electrical component box 24, near the lower apex 48 corresponding to the triangular portion 40; the start magnet switch 70 is obliquely placed in an area, of the inside of the electrical component box 24, near the side portion 50 extending to the second upper apex 46b from the lower apex 48; and the bank angle sensor 82 is placed in a location, of the inside of the electrical component box 24, which is close to a location in which the battery 60 is placed and a location in which the start magnet switch 70 is placed and above the location in which the start magnet switch 70 is placed.

As a result, by placing the battery 60 in an area, of the inside of the electrical component box 24, near the lower apex 48 corresponding to the triangular portion 40 and placing the start magnet switch 70 in an area, of the inside of the electrical component box 24, near the side portion 50 extending to the second upper apex 46b from the lower apex 48, it is possible to shorten the distance from the battery 60 to the start magnet switch 70. Moreover, in the existing example, the start magnet switch 70 is horizontally placed; in the present embodiment, the start magnet switch 70 is vertically placed and inclined along the side portion 50, which makes it easy to drain water. In addition, by obliquely placing the start magnet switch 70, it is possible to place the bank angle sensor 82 between the battery 60 and the start magnet switch 70, which makes it possible to put the electrical components together more effectively.

In the present embodiment, the electronic control unit 80 is housed in the electrical component box 24, and, in the electrical component box 24, the protrusion 94 for guiding the wire harnesses 90 is provided between the ECU 80 and the bank angle sensor 82.

As a result, even when the length of the wire harness 90 with respect to the ECU 80 varies, the protrusion 94 prevents the wire harness 90 from touching the bank angle sensor 82, which makes it possible to prevent vibrations of the wire harness 90 from directly entering the bank angle sensor 82. This contributes to prevention of disturbance to the bank angle sensor 82.

Moreover, by providing, between the ECU 80 and the bank angle sensor 82, the protrusion 94 for guiding the wire harness 90, it is possible to dispose the wire harness 90 leading to the ECU 80 and other wire harnesses 90 separately by using the protrusion 94, which makes it possible to achieve an increase in efficiency of wiring work. Furthermore, it is possible to prevent the rubber mount effect of the bank angle sensor 82 from being lost by being pressed by the wire harness 90.

In the present embodiment, in the electrical component box 24, the main fuse 72, the sub-fuse 78, the diode 76, and the regulator 84 are additionally placed. As a result, it is possible to further increase the number of electrical components that are put together in the electrical component box 24, which makes it possible to curb the influence of mud and so forth on the electrical components more effectively even when traveling off road, for example.

In the present embodiment, in an area, of the inside of the electrical component box 24, from the lower apex 48 corresponding to the triangular portion 40 to the second upper apex 46b, the battery 60, the start magnet switch 70, the main fuse 72, and the sub-fuse 78 are placed in this order.

As a result, it is possible to shorten the distance between the main fuse 72 and the sub-fuse 78 and perform wiring work and maintenance work smoothly. Moreover, it is possible to drain water from the second upper apex 46b corresponding to the triangular portion 40 toward the lower apex 48.

In the present embodiment, the upper part of the electrical component box 24 is placed below the seat frame 36 on the outward side in the vehicle-width direction, and, in the upper end face 68 of the electrical component box 24, the ribs 100 for guiding the wire harnesses 90 are provided in locations that overlap the seat frame 36 when viewed from a side.

As a result, since the upper part of the electrical component box 24 is placed below the seat frame 36 on the outward side in the vehicle-width direction, the upper end face 68 of the electrical component box 24 is exposed so as to be seen from above. In addition, since the ribs 100 for guiding the wire harnesses 90 are provided in the upper end face 68 of the electrical component box 24, it is possible to dispose the wire harnesses 90 using the upper end face 68 of the electrical component box 24, which makes it possible to improve the efficiency of wiring work.

In the present embodiment, the ribs 100 include at least one first rib 100a and at least one second rib 100b which are placed in an alternating manner, the first rib 100a is provided on the outward side in the vehicle-width direction and has an arc-like shape facing the inward side in the vehicle-width direction, and the second rib 100b is provided on the inward side in the vehicle-width direction and has an arc-like shape facing the outward side in the vehicle-width direction. As a result, since the wire harnesses 90 can be retained alternately by the first rib 100a and the second rib 100b on the right and left sides, it is possible to mount the wire harnesses 90 easily and securely.

In the present embodiment, the electrical component box 24 includes a coupler holding portion 104 that holds the coupler 102 for coupling a plurality of wire harnesses 90 together, and the coupler holding portion 104 is placed inside the main frame 30.

As a result, the coupler holding portion 104 can make at least the coupler 102 waterproof. In addition, since the coupler holding portion 104 is placed inside the main frame 30, it is possible to make the coupler 102 waterproof more appropriately and prevent easy access to the coupler 102 by an occupant or the like.

In the present embodiment, the coupler holding portion 104 includes a harness holding portion 106 for holding the wire harnesses 90. As a result, it is possible to prevent the wire harness 90 leading to the battery 60 and the wire harness 90 coming from the battery 60 from hanging down loosely, which makes it possible to prevent, for example, unusual noises from being caused as a result of the wire harness 90 swinging or touching another apparatus.

It goes without saying that this invention is not limited to the embodiment described above and any change can be made thereto within the scope of this invention.

While the present invention has been described above by using the preferred embodiment thereof, the technical scope of the present invention is not limited to the above description of the embodiment. It is obvious to a person skilled in the art that various changes or improvements can be made to the above-described embodiment. As is clear from the description of the claims, any embodiment obtained by making such changes or improvements to the above-described embodiment can also be included in the technical scope of the present invention. Moreover, characters in parentheses described in the claims are the same as the characters in the attached drawings to facilitate understanding of the present invention and are not meant to limit the present invention to the elements identified with these characters.

What is claim is:

1. A saddle vehicle comprising:
a front wheel;
a rear wheel; and
an electrical component box that houses a battery and includes mounting portions on which electrical components, which are connected to the battery, are mounted, wherein
the electrical component box is made of resin,
at least a bank angle sensor is housed in the electrical component box,
the electrical component box is fixed to a side of a triangular portion of a frame made up of a main frame, a seat frame, and a rear frame,
the electrical component box includes a coupler holding portion that holds a coupler for coupling a plurality of wire harnesses together, and
the coupler holding portion is placed inside the main frame.

2. The saddle vehicle according to claim 1, wherein
the battery is placed inside the electrical component box near a lower apex corresponding to the triangular portion,
a start magnet switch is obliquely placed inside the electrical component box near a side portion extending to one upper apex from the lower apex corresponding to the triangular portion, and
the bank angle sensor is placed inside the electrical component box close to the battery and the start magnet switch and above the start magnet switch.

3. The saddle vehicle according to claim 1, wherein
an electronic control unit is housed in the electrical component box, and
a protrusion for guiding a wire harness is provided between the electronic control unit and the bank angle sensor.

4. The saddle vehicle according to claim 3, wherein
a main fuse, a sub-fuse, a diode, and a regulator are additionally placed in the electrical component box.

5. The saddle vehicle according to claim 4, wherein
the battery, the start magnet switch, the main fuse, and the sub-fuse are placed in this order in an inside of the electrical component box, from the lower apex corresponding to the triangular portion to the one upper apex.

6. The saddle vehicle according to claim 1, wherein
an upper part of the electrical component box is placed below the seat frame on an outward side in a vehicle-width direction, and
ribs for guiding wire harnesses are provided an upper end face of the electrical component box in locations that overlap the seat frame when viewed from a side.

7. The saddle vehicle according to claim 6, wherein
the ribs include at least one first rib and at least one second rib which are placed in an alternating manner,
the first rib is provided on an outward side in the vehicle-width direction and has an arc-like shape facing an inward side in the vehicle-width direction, and
the second rib is provided on an inward side in the vehicle-width direction and has an arc-like shape facing an outward side in the vehicle-width direction.

8. The saddle vehicle according to claim 1, wherein
the coupler holding portion includes a harness holding portion for holding wire harnesses.

* * * * *